United States Patent
Brown

[11] Patent Number: 6,032,830
[45] Date of Patent: *Mar. 7, 2000

[54] DISPENSER FOR FLUENT PRODUCTS

[75] Inventor: Daniel P. Brown, Palos Park, Ill.

[73] Assignee: Flexible Products Company, Marietta, Ga.

[*] Notice: This patent is subject to a terminal disclaimer.

[21] Appl. No.: 08/828,665

[22] Filed: Mar. 31, 1997

Related U.S. Application Data

[63] Continuation of application No. 08/264,641, Jun. 23, 1994, Pat. No. 5,615,804.

[51] Int. Cl.[7] .................................................. B67D 5/52
[52] U.S. Cl. .................. 222/136; 222/145.5; 222/145.7; 222/287; 222/394; 222/518
[58] Field of Search .................................. 222/135, 136, 222/137, 145.1, 145.5, 145.7, 289, 394, 509, 510, 518

[56] References Cited

U.S. PATENT DOCUMENTS

| | | | |
|---|---|---|---|
| 5,097,993 | 3/1992 | Davis | 222/509 |
| 5,180,082 | 1/1993 | Cherfane | 222/145 |
| 5,271,537 | 12/1993 | Johnson | 222/509 |
| 5,277,344 | 1/1994 | Jenkins | 222/504 |
| 5,615,804 | 4/1997 | Brown | 222/136 |

FOREIGN PATENT DOCUMENTS

| | | | |
|---|---|---|---|
| 3802519 | 8/1989 | Germany | 222/394 |

*Primary Examiner*—Joseph A. Kaufman
*Attorney, Agent, or Firm*—Vedder Price Kaufman & Kammholz

[57] ABSTRACT

A dispensing gun for fluent products such as viscous adhesives and sealants. The gun includes a removably mounted nozzle and fittings for attachment to a product source such as a can or a hose. A valve body has product inlet and outlet passages with flow being controlled therethrough by a valve that includes a nose portion seated in the valve body, and a rod that extends through the nose portion of the valve and seats on tapered surfaces inside the end of the nozzle. The valve contains a shrouded internal spring biasing the valve to a closed position. A trigger engages the yoke carrying the valve and the valving rod and moves the yoke so that the rod and valve move between open, closed and intermediate positions. In one preferred form, the valving rod may be adjusted between positions wherein more or less product is dispensed in response to full trigger movement.

18 Claims, 4 Drawing Sheets

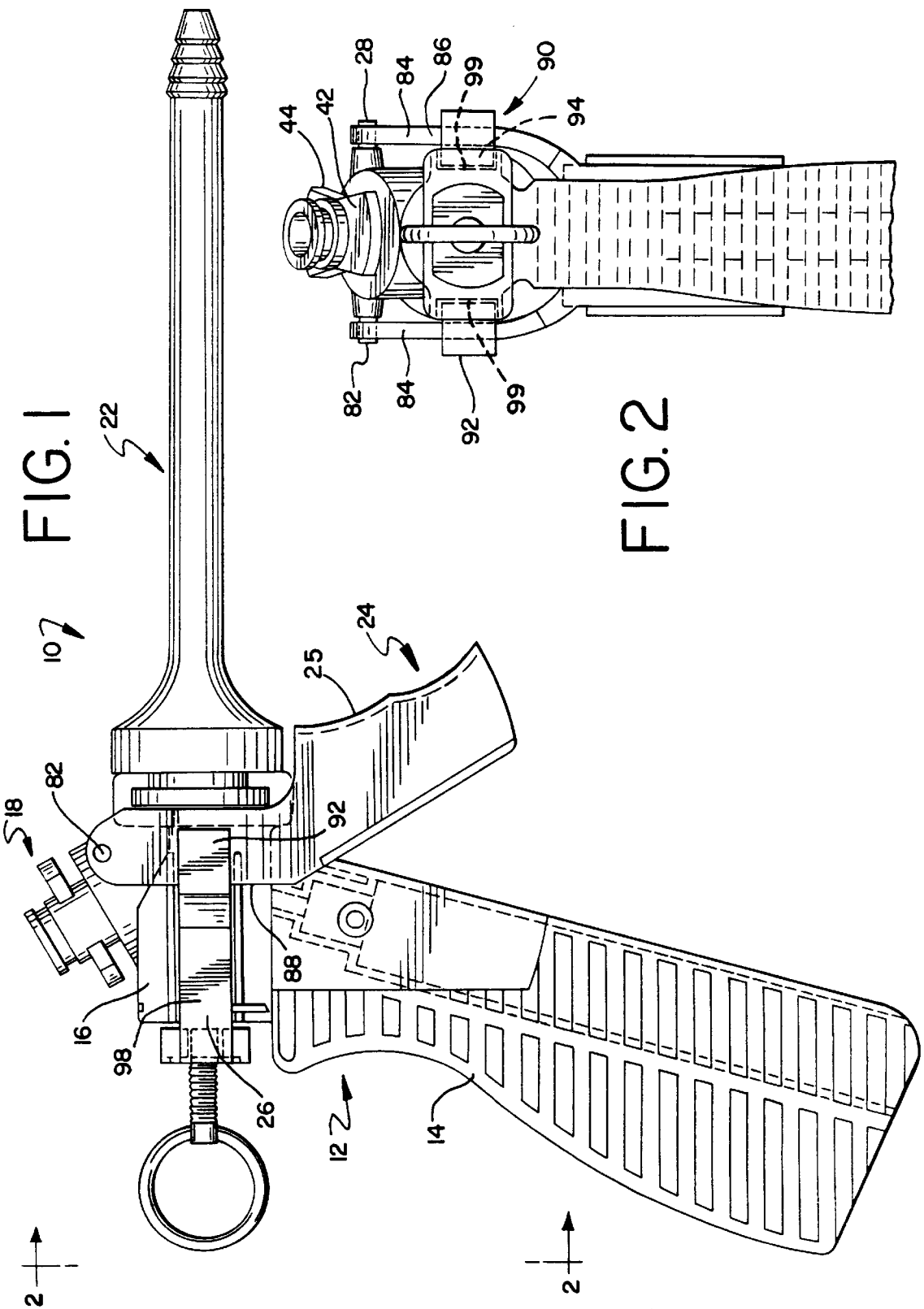

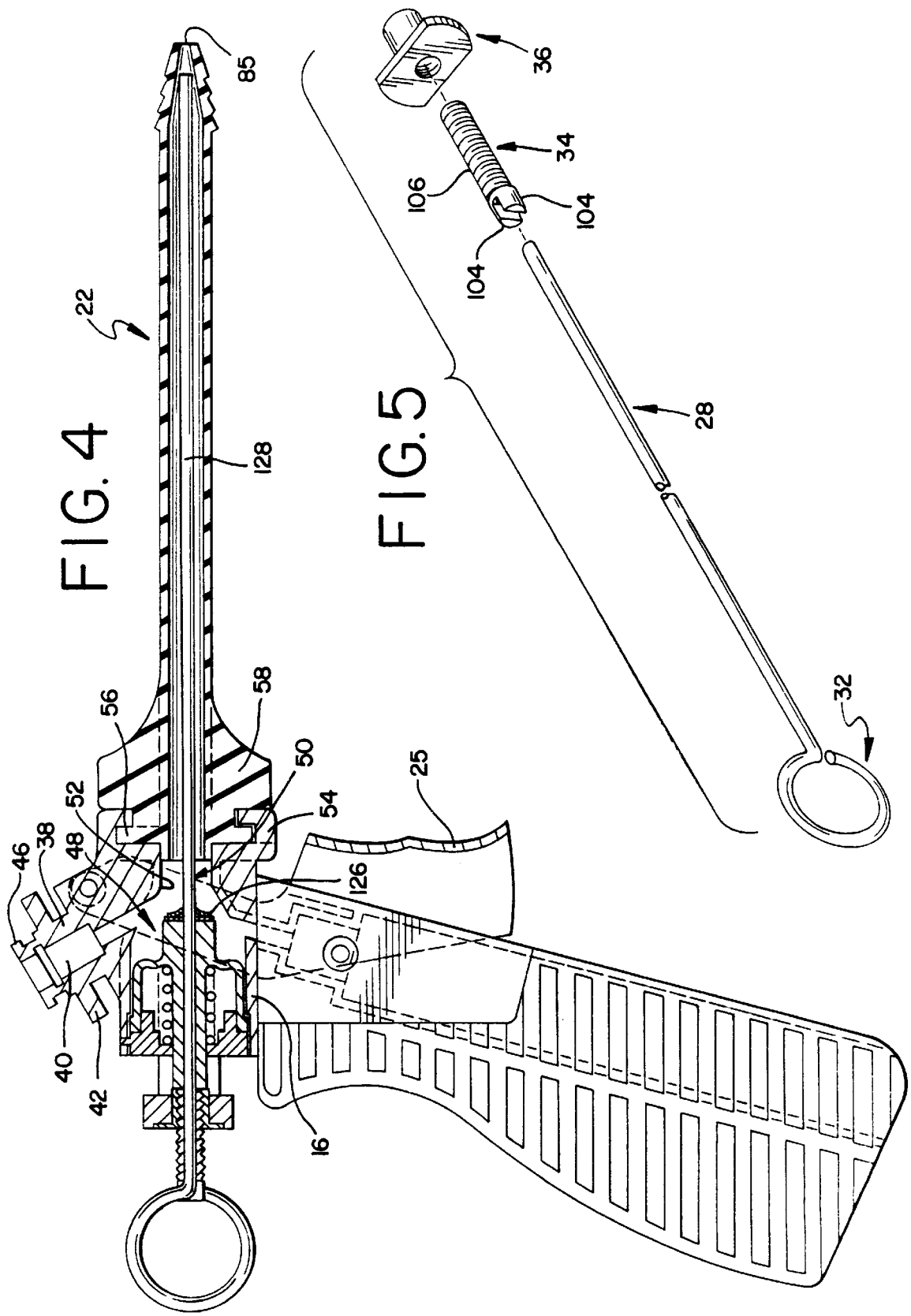

DISPENSER FOR FLUENT PRODUCTS

This application is a continuation of application Ser. No. 08/264,641, filed on Jun. 23, 1994, now U.S. Pat. No. 5,615,804.

BACKGROUND OF THE INVENTION

The present invention relates generally to dispensing apparatus for fluent products, and more particularly, to a hand-held gun for use in accurate dispensing of such fluent products.

By way of example, products which may be dispensed using the apparatus of the invention include so-called single component chemical foams, such as single-component urethane foams; various so-called silicone compositions, including silicone foams; caulking products such as acrylics, silicone-acrylic, silicone or other caulks and sealants; adhesives, such as those used in laminating or the like; and miscellaneous other products where a strip, bead or spray of the product is desired to be dispensed under careful control.

While the dispensing gun of the invention advantageously achieves its objects by including an attachment for an aerosol of like pressurized can, the gun is designed so that, with minimum modification, it may be fed from a cartridge or from a hose secured to the gun at one end and to a bulk container of a dispensable fluent product at the other end.

It is well-known that many products which may be stored and merchandised in cans and then dispensed therefrom are already satisfactory from a product standpoint. However, it is often difficult to dispense and apply such products to the satisfaction of the user, because of the manner in which the cans are pressurized and, more particularly, because the dispensing valves fixed to the cans are very inexpensive and not adapted for relatively precise dispensing. A great deal of skill is required to manipulate some such dispensing nozzles. Still others, regardless of the degree of care or skill applied, are simply designed to dispense products at a high rate or not at all.

The shape of the product container, normally a can, also often makes product application difficult. In particular, most relatively viscous products are dispensed with the can held in an inverted position, because of the nature of the contents and the pressurization system. This arrangement, plus the need to keep the body of the can away from the work area, results in an awkward position of the hands and fingers relative to the work site. The work site is often obscured by the can and attempting to manipulate the can while holding the same inverted and steady is a tedious task.

As a result, a number of adapters and the like have been proposed whereby cans may be associated with adaptor-dispenser and held away from the work. Such arrangements have, in some instances, provided improved visibility and ease of manipulation. However, most or all of such systems have suffered from the drawbacks of the dispensing gun valve. Thus, if there are inherent limitations in the dispensing mechanism, simply locating the can better or move conveniently will not improve the dispensing action. When such an action is inherently imprecise or undesirable, this aspect simply carries over to the dispensing apparatus.

Regarding dispensable fluent but viscous products, such as expanding and non-expanding chemical foams, including single component urethanes, caulks, and the like, several drawbacks have been encountered. First, the user often desires to lay down a rather narrow bead of material in one instance and a wider, higher bead in another instance. While bead size can sometimes be controlled when dispensing caulks from a caulking gun, the inherently intermittent nature of the manual trigger dispensing mechanism virtually guarantees a pulsating type delivery. Where a pressurized can is used, this aspect can be overcome but controlling bead size for one application and then later changing to another size, particularly a smaller size, is not possible, especially where the size is determined by cutting off the nozzle end. This applies equally to caulking tubes and guns. Regarding more fluent products, control of discharge consistent with acceptable dispensing rates is still a significant problem.

Certain prior art dispensers for single products have suffered from other drawbacks, including difficulties arising when a part of the valve component or other part of the dispensing mechanism was locked shut after a short period of non-use by the adhesive action of the material being dispensed. Almost all urethanes make excellent adhesives, but if the dispensing operation is intermittent, problems of undesired internal adhesions can arise as a result of allowing the apparatus to remain for a period of time when a component is filled with the foam or other product being dispensed.

In view of the above and other shortcomings in apparatus for dispensing viscous products, it is an object of the invention to provide an improved gun or the like for dispensing fluent products.

Another object of the invention is to provide an improved apparatus for dispensing more or less viscous products which are naturally adhesive in nature and which tend to clog dispensing apparatus.

A further object of the invention is to provide a dispensing gun which is able to provide a metering action for the product being dispensed and wherein the width or height of a bead of the dispensed product, or a spray pattern can be easily adjusted and maintained at a desired level.

A still further object of the invention is to provide a dispensing gun for fluent products which gun can be manufactured at extremely low cost, particularly in view of its advantages and characteristics.

Yet another object of the invention is to provide a gun which is adaptable, without material change, to dispense products either from bulk containers through attachment by a hose or the like, or to dispense products from an aerosol can or like container removably affixed to the gun.

Another object of the invention is to provide a gun with a novel valving arrangement for controlling flow of the products to be dispensed.

A further object of the invention is to provide a gun having a removable nozzle including an elongated central passage and an annular inner surface serving as a seat for a valving rod forming a part of the gun.

A still further object of the invention is to provide a valving system wherein two valves arranged in series are operated by a common mechanism, and in which the rate of dispensing or bead size of the product dispensed can be regulated by adjusting the position of the valves.

Yet another object of the invention is to provide a gun which includes a valving rod that may be easily rotated without tools, as by the fingers only, for example, relative to the nozzle within which it reciprocates, so as to free any adhesive connection which may have formed between the rod and the nozzle.

Another object of the invention is to provide a dispensing gun wherein manipulation of a valving rod can act to preset the size of the bead of material being dispensed.

A further object of the invention is to provide a valving arrangement in a dispensing gun whereby, with a proper setting of a pair of cooperating valves, a bead of material may be dispensed without the need for manipulating the gun trigger.

A still further object of the invention is to provide a novel valving arrangement including a rod, and a rod handle mechanism made at extremely low cost and cooperating with counterpart elements forming a part of the trigger mechanism.

Yet another object is to provide a dispensing gun having a handle, a center outlet passage and a first valve having a core, seating portion, a valve spring and a skirt surrounding the valve spring, with a rod extending through the valve core and into a removable nozzle having a reduced diameter outlet passage adapted to be closed off by the valving rod.

The foregoing and other objects and advantages the invention are achieved in practice by providing a novel dispensing gun having a body with product inlet and outlet passages, a removable nozzle affixed to the outlet passage, a trigger unit and a double valve arrangement actuated by the trigger and including a first valve having a reciprocable, seat-engaging nose portion movable in the product outlet passage between open and closed positions and a valving rod with a shank extending through the first valve, through a passage in the nozzle and having a free end closing off an inner tapered end portion of the nozzle.

The manner in which the foregoing and other objects and advantages of the invention are achieved in practice will become more clearly apparent when reference is made to the following detailed description of the preferred embodiments of the invention set forth by way of example and shown in the accompanying drawings, in which like reference numbers represent corresponding parts throughout.

BRIEF DESCRIPTION OF THE DRAWINGS

FIG. 1 is a side elevational view of the dispensing apparatus of the invention;

FIG. 2 is a fragmentary rear elevational view of the apparatus of FIG. 1, taken along lines 2, 2 thereof;

FIG. 4 is a view similar to that of FIG. 3, but showing the trigger and certain of the valve components in another position of use;

FIG. 5 is an exploded view, partly diagrammatic in character, and showing the arrangement of the valving rod and two of the components for adjusting the position of the valving rod;

DESCRIPTION OF THE PREFERRED EMBODIMENTS OF THE INVENTION

While the dispensing gun of the invention may be embodied in a number of different forms and certain of the parts may be constructed and arranged in a different manner, A detailed description will be given of one form of apparatus which is extremely economical to manufacture and which provides a number of advantages in use.

Figure 6:
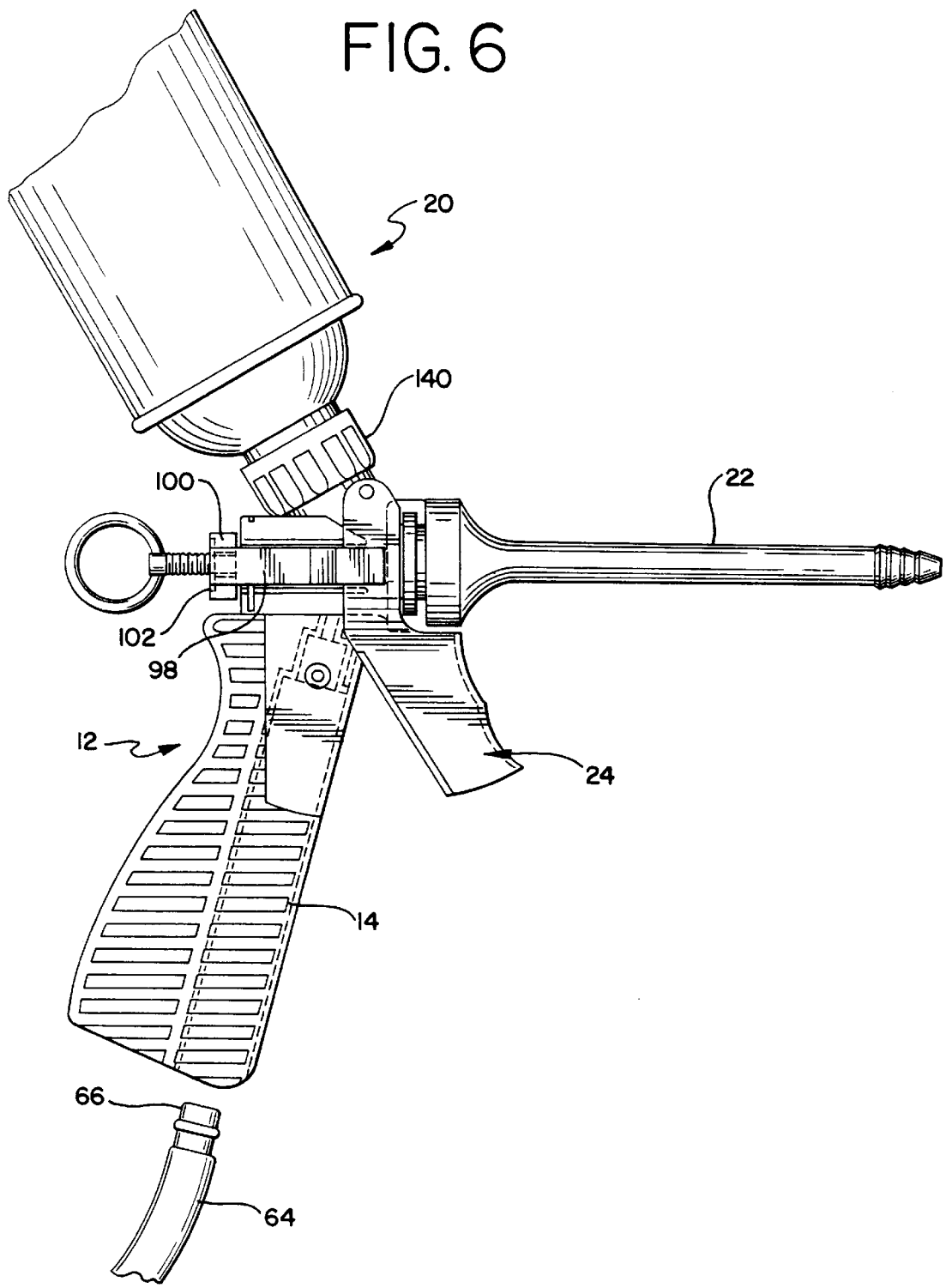
FIG. 6 is a view similar to that of FIG. 1, but showing a dispensing can positioned on the gun and a portion of the product supply hose, useful with another form of the invention.

Referring now to the drawings in greater detail, FIGS. 1–4 show the apparatus to be embodied in a gun generally designated 10 and having a number of principal components. These include a gun body generally designated 12 and shown to have a handle portion 14, a valve housing portion 16, and a fitting generally designated 18 for locking engagement with an associated aerosol can generally designated 20 (FIG. 6). In addition, the gun includes a detachable dispensing nozzle designated 22, a trigger generally designated 24, a trigger yoke 26, and a valving rod generally designated 28 (FIG. 5). In keeping with the invention, an internal valve assembly generally designated 30 is an important element of the invention.

Other important elements of the invention include the loop-like handle generally designated 32 on one end of the valving rod, a rod positioning or adjusting sleeve generally designated 34, and a threaded yoke insert generally designated 36.

Referring again to the gun body 12, the fitting 18 for cooperatively receiving the aerosol can 20 in locking relation includes a cylindrical body 38 (FIG. 4), having walls defining a center product inlet passage 40. A locking mechanism in the form of a pair of large, partly cylindrical ears 42 separated by reliefs or notches 44 extend outwardly from the body 38. The outermost end of the body 38 includes a smaller, continuous radial flange 46.

The center product inlet passage 40 extends inwardly into an annular product discharge area generally designated 48 and shown to be comprised of inner surfaces forming the valve body 16 of the gun. A product outlet passage generally designated 50 is defined in part by an annular valve seat surface 52, a portion of which may be tapered. Flanged partial sidewalls 54 with cutouts or reliefs are provided for registration with a pair of twist-and-lock ramp surfaces 56 forming ears on the inner end portion 58 of the nozzle 22.

As shown in phantom lines in FIGS. 1–4, the handle 14 optionally includes an inner passage 60 defined by cylindrical sidewalls 62 for accommodating a hose 64 (FIG. 6) having a press-in fitting 66 on the end thereof. The press-in fitting 66 is receivable within a reduced diameter recess 68 formed by sidewalls 70; a product inlet passage 72 extends upwardly from the recess 68 and into the product discharge area 48. According to the invention, because a can or a hose may be used to supply a single component product, either the passage 72 or the passage 40 may be closed off or blinded so as to prevent leakage when one of the passages is not to be used. Conceivably, if two separate components were to be supplied, both passages could be utilized at the same time.

Referring again to the nozzle 22, the outer end 74 therein is tapered inwardly and terminates in a product dispensing opening 76. The interior sidewall 78 defines an elongated passage 80 for the product. The passage 80 terminates in a tapering, frusto-conical seating surface 82 for the forwardmost portions of the outer tip 84 of the valving rod 28. As will be described in detail elsewhere herein, the combination of the cylindrical rod and the tapered valve seat help control product discharge conditions.

Figure 3:
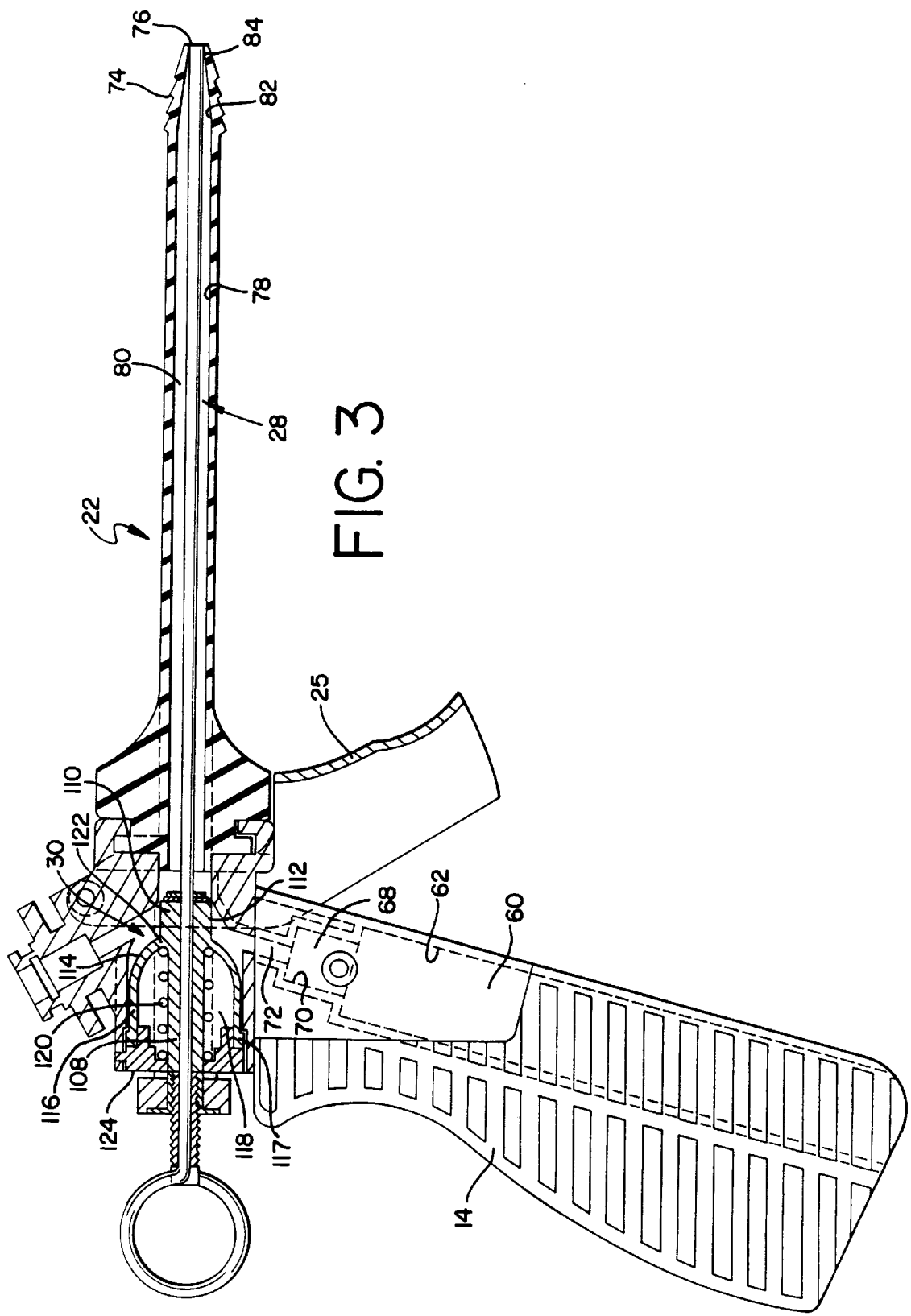
FIG. 3 is a side view, partly in elevation and partly in section, and showing the valve components of the apparatus in a first position of use.

As shown in FIGS. 1 and 3, the finger-engaging portions 25 of the trigger assembly 24 are adapted to pivot about the axes of left or right hand pins 82 each extending through an opening in the ears 84 on top of the trigger. Each of the flanks or sidewalls 86 of the trigger includes a rear contact surface 88 received within a slotted yoke generally designated 90 and shown to include spaced apart, forwardly directed, inner and outer flanges 92, 94. The finger-engaging forward surfaces 25 of the trigger 24 are operative to pivot the trigger about the pivot axis 82 and move the yoke 90 backwardly.

As is further shown in the drawings, the yoke includes a pair of legs 98 (FIGS. 1, 6) movable in slots 99 (FIG. 2) and a transverse bar 100 for positioning and moving the valving rod 28. The bar 100 includes a center opening into which a threaded yoke insert 36 is secured by a press fit.

In keeping with the invention, a tubular adjusting sleeve 34 (FIG. 1, 5) includes a pair of spaced apart locking ears 104 and a threaded shank portion 106. During manufacture, the adjusting sleeve 34 is pushed fully onto the rod 28, and the tabs 104 are crimped inwardly to engage adjacent portions of the rod handle 32 and lock the two members against relative rotation. This converts the ring 32 into a twist handle that affords great mechanical advantage relative to the rod shank, and makes it easy to rotate the rod, even if stuck by an adhesive, relative to the nozzle.

Another important element of the dispensing gun is the main operating valve generally designated 30. This unit is preferably made from a single piece of rubber or plastic and includes (FIG. 3) a cylindrical center core 108, a forwardly extending nose portion 110 with a cylindrical outer seat-engaging surface 112, and a contoured flexible protective skirt 114. The skirt includes a rear margin 116 having a locking bead 117 forming its remote end; the skirt 114 also defines an inner space 118 in which a coil-type valve return spring 120 is positioned. One end of the spring 120 bears against a shoulder 122 between the valve core 108 and the inner margin of the skirt 114. The locking bead 117 of the skirt is positioned by an end piece 124 which locks the skirt relative to the valve body and also provides a perch or reaction surface to engage the other end of the valve spring 120. The contoured skirt 114 of the valve 30 is flexible and when the core is pulled rearwardly, the contoured surface of the skirt telescopes upon itself as shown in FIG. 4. This action frees the cooperating seating surfaces 112, 52 on the valve nose and the valve housing respectively, to permit product to flow from the annular space 48 to the nozzle passage. By moving the rod which is secured to the main valve 30, the end 84 of the rod unseats from the taper 82, allowing product to pass out the nozzle.

In the preferred form of apparatus the valving rod is locked against axial movement relative to the nose of the valve core by an inexpensive spring steel "Tinnerman" or like locking fastener 126 wedged about the outer diameter of the shank 128 of the valving rod 28.

Referring now to the use of the gun, it will be assumed that a can of fluent material, such as a can 20, contains a low-expansion but foamable material such as a single-component urethane foam. The can and fitting 140 are manipulated such that parts of the fitting mate with the flange ears 42 on the cylindrical body 38. This places the stem (not shown) of a Clayton valve or the like within a passage 40 and secures same in fluid-tight relation. For this purpose the small radial flange 46 abuts a surface on the can valve. Axial movement of the can valve in a known manner permits contents of the can to begin flowing into the annular product discharge area 48.

With the trigger and valve in position of FIG. 3, the main valve 30 is closed and the product cannot escape as long as the seating surfaces 112 on the nose of the valve and the valve seat surface 52 are in contact. When the trigger is actuated, it swings through an arc and, depending on the relative position of the yoke 26, as is discussed elsewhere herein, the rear surfaces of the trigger engage the yoke 26. Continued trigger movement pulls the valving rod 28 and the valve core 108 rearwardly, separating the seating surface 52, from the nose 112 at the same time the far end 84 of the valving rod 128 withdraws from the tapered surfaces 82 on the forward portion of the nozzle. This also opens the passage 85 (FIG. 4) inside the tapered surface 84. Thus, the product is permitted to flow out the body outlet passage 50, into the interior nozzle passage 80, and ultimately, to the point of application. The two valves open with the same action because the yoke, acting through the insert 36, carries the threaded sleeve 34 and thus the valving rod 28 and the valve core 108 to the rear.

An important feature of the invention is the adjustability of the valving rod relative to the other components, particularly the yoke 26.

As will be noted, the cooperating threads on the yoke insert 36 and the adjusting sleeve 34 permit adjustable relative motion of these parts. As long as the valve nose 112 remains seated on surface 53, rotating the rod, and hence the sleeve, backs the yoke toward the rear (to the left in the figures). In this position, a lost motion space is formed between the rear surface of the trigger and the engagement point on the yoke 26. Because of this, the rear surfaces of the trigger do not actually engage the yoke until the trigger has been depressed considerably. Moreover, since the movement range of the trigger is limited, there is little motion left to unseat the valves 30, 84.

This lost motion simply means that the nose of the valve moves only slightly off the tapered seating surface 52, and only a small amount of product will flow. Since the rod and the valve core are secured so as to move together, a small opening of the valve 30 results in a proportionally small opening between the tip 84 of the rod and the tapered rod seating surface 82. Under these circumstances, a very low flow rate can be achieved because, even with a full pull of the trigger, very little of the valve is opened. Thus, suitable adjustments may be made to secure a very low dispensing rate.

Referring now to another use of the threaded or other adjustable connection between the yoke and the operating rod, a suitable adjustment may be made in the other direction with another result. Here, the ring is manipulated so that the yoke and rod move relative to each other not only to their normal positions, such as that shown in FIG. 3, but the ring is further rotated until, with the forward face of the yoke engaging the end piece, continued rotation actually begins to pull the valving rod and the core within which it is locked to a retracted position, against the force of the return spring. In this way, the valve 30 is slightly opened as the rod pulls the nose of the core off its seat. By proper manipulation, this can serve as a vernier adjustment to the valve and the rod and dispensing will commence at a low rate. In this way, once the rod is manipulated until a desirable flow rate is achieved, it is not necessary to use the trigger at all.

Accordingly, the provision of the adjustment between the rod and the yoke, with the valve core being secured to the rod, permits various operational capabilities. In the normal operation, the rod is placed somewhat in the middle of its travel and the trigger engages the yoke early in the stroke of the trigger, permitting a wide variation in dispensing rates. Adjusting the rod such that there is much lost motion between the trigger and the yoke reduces the maximum potential discharge rate, and adjusting the rod in the other direction can serve to open the valve and permit dispensing with no trigger action.

This ability to create a fine adjustment at extremely low cost, i.e., by making the adjusting sleeve in the form of a simple part that may be crimped on to the valving rod is a significant advantage of the invention. Likewise, the arrangement of the main valve with its carrier yoke and the spring enclosed within a flexible skirt provides isolation of the operative components from the product being dispensed.

It will thus be seen that the present invention provides an improved dispensing gun, said apparatus having a number of advantages and characteristics, including those brought out in the specification and drawings and others which are inherent in the invention.

A description of one form of the dispensing gun having been illustrated by way of example, it is anticipated that variations and modifications of the described form of the apparatus will occur to those skilled in the art and it is anticipated that such variations and changes may be made without departing from the spirit of the invention or the scope of the appended claims.

What is claimed is:

1. An improved dispensing gun for fluent products, said dispensing gun comprising, in combination, a valve body having a product inlet passage and a product outlet passage, said outlet passage including a portion forming valve seat surfaces, a mount for receiving a removable nozzle and a fitting for attachment to a source of fluent products in liquid-tight relation, a valve disposed in said valve body and including a core portion, a nose forming a part of said core and having seating surfaces thereon for contact with said valve seat surfaces on said outlet passage, a spring urging said valve core to a closed position wherein said seating surfaces are in mutual engagement, an operating rod extending through and secured to said core against axial movement, a valving rod having a rear handle portion and a nose portion adapted to cooperate with said nozzle affixed to said gun, with said nozzle including tapered seating surfaces for accommodating said operating rod, a yoke secured to said operating rod, and a trigger movably secured to a portion of said body and operative to move said yoke relative to said housing, with said parts being constructed and arranged so that trigger movement unseats both said valving rod and said nose portion of said core to dispense fluid products from said nozzle.

2. An improved dispensing gun for fluent products, said dispensing gun comprising, in combination, a valve body and a dispensing nozzle, said valve body having a product inlet passage, a product outlet passage, and a formation for liquid-tight attachment to a source of said fluent products, said outlet passage including annular surfaces forming a valve seat, a valve core disposed in said valve body and including a nose with surfaces dimensioned and shaped for fluid-tight contact with said annular surfaces forming said valve seat in said outlet passage, a resilient, force-applying element urging said valve core to a liquid-tight closed position wherein said nose surfaces engage said valve seat, an operating rod extending through said core to secure said core and said rod for axial movement as a unit, said operating rod having a rear end portion and a forward end portion with sealing surfaces cooperating with radially inner, annular surfaces on said dispensing nozzle adjacent its discharge end, an operative connection between a portion of said operating rod and a trigger mounted for movement relative to said valve body, with said trigger, said rod, and said valve core being constructed and arranged so that trigger movement unseats both said forward end of said operating rod and said nose portion of said core to permit fluent products to flow from said product inlet passage into and through said outlet passage and out of said discharge end of said dispensing nozzle.

3. An improved dispensing gun as defined in claim 2 wherein said operative connection is an adjustably positionable connection.

4. An improved dispensing gun as defined in claim 2 wherein said valve core further includes a flexible skirt portion serving to cover said resilient, force applying element.

5. An improved dispensing gun as defined in claim 2 wherein said handle portion of said operating rod comprises a loop integrally formed as a part of said operating rod.

6. An improved dispensing gun as defined in claim 2 wherein said dispensing nozzle is removably mounted to said valve body by a bayonet lock.

7. A dispensing gun as defined in claim 2 wherein said formation for attachment to said source of fluent product comprises a bayonet lock arrangement for removably receiving an aerosol can having a dispensing valve portion.

8. A dispensing gun as defined in claim 2 wherein said gun includes a handle unit, and wherein said formation for attachment to said source of fluent products includes a passage within said gun handle unit for accommodating the end portion of a product dispensing hose.

9. A dispensing gun for fluent products, said gun comprising, in combination, a gun handle, a formation for attachment to a source of said fluent product, a valve body portion, a product inlet passage extending from said formation into said valve body, a product outlet passage including portions forming a valve seat, a nozzle having an inner end portion in communication with said product outlet passage, a central passage portion and a remote end portion with a dispensing opening therein defined in part by an annular operating rod seating surface, a flow control valve disposed within said valve body portion and including a core with a nose portion having surfaces thereon for engaging said valve seat portion of said outlet passage in cooperating liquid-tight relation, an operating rod extending through said valve core and having an outer end terminating adjacent said remote end of said nozzle, and an inner end including a portion for actuation in response to trigger movement, a trigger forming a part of said gun, a yoke reciprocably positioned by a portion of said gun, said yoke of said rod being movable in response to trigger movement to initiate and continue discharge of said fluent product.

10. An improved dispensing gun as defined in claim 9 wherein said yoke includes an internally threaded portion, and wherein said operating rod includes an externally threaded portion, said yoke threads and said rod threads cooperating with each other in use to permit adjustable positioning of said rod relative to said yoke.

11. An improved dispensing gun as defined in claim 10 wherein said internally threaded portion of said yoke comprises a yoke insert portion having said internal threads, and wherein a sleeve having external threads is disposed over a part of said rod to form said externally threaded portion thereof, said sleeve being secured to said rod so as to rotate therewith, and with said internal and external threads cooperating with each other to provide said adjustable positioning of said rod relative to said yoke.

12. A dispensing gun as defined in claim 9 wherein said formation for attachment to said source of fluent product comprises a bayonet lock arrangement for removably receiving the dispensing valve portion of an aerosol can.

13. A dispensing gun as defined in claim 9 wherein said formation for attachment to said source of fluent products includes a passage within said gun handle unit for accommodating the end portion of a product dispensing hose.

14. A dispensing gun as defined in claim 9 wherein said rod is adjustable relative to said yoke so as to cause said rod to move relative to said nozzle outlet and to cause said nose of said valve core to move relative to said valve seat, thereby, in one position of adjustment, enabling said fluent product to be dispensed without movement of said trigger or said yoke.

15. A dispensing gun for fluent products, said gun comprising, in combination, a gun handle, a formation for attachment to a source of said fluent product, a valve body portion, a product inlet passage extending from said formation into said valve body, a product outlet passage including portions forming a valve seat, a nozzle having an inner end portion in communication with said product outlet passage, a central passage portion and a remote end portion with a dispensing opening therein defined in part by an annular operating rod seating surface, a flow control valve disposed within said valve body portion and including a core with a nose portion having surfaces thereon for engaging said valve seat portion of said outlet passage in cooperating liquid-tight relation, an operating rod extending through said valve core and having an outer end terminating adjacent said remote end of said nozzle, and an inner end including a portion for actuation in response to trigger movement, a trigger forming a part of said gun, a yoke reciprocably positioned by a portion of said gun, said yoke and said rod being movable in response to trigger movement and said yoke also being adjustable relative to said rod adjusting the position of said rod relative to said yoke varies the point of engagement between said trigger and said yoke and varies the rate at which said fluent product is dispensed when said trigger is fully actuated.

16. An improved dispensing gun for fluent products, said dispensing gun including a valve body having a formation for liquid-tight attachment to a source of fluent products, a product inlet passage, a product outlet passage, and annular surfaces forming a valve seat, within said valve body between said product inlet passage and said product outlet passage, a valve core disposed in said valve body and including a nose with surfaces dimensioned and shaped for fluid-tight contact with said annular surfaces forming said valve seat, a resilient, force-applying element urging said valve core to a liquid-tight closed position wherein said nose surfaces engage said valve seat, an operative connection between a portion of said valve core and a trigger mounted for movement relative to said valve body, with said trigger and said valve core being constructed and arranged so that trigger movement unseats said nose portion of said core to permit fluent products to flow from said product inlet passage past said valve seat and out of said outlet passage in said valve body.

17. An improved dispensing gun for fluent products, said dispensing gun comprising, in combination, a body having interior product flow passages including an outlet passage defined by an annular valve seat and a valve core with nose surfaces engaging said valve seat, a dispensing nozzle having one end in communication with said outlet passage, a formation for liquid-tight attachment to a source of said fluent products, a resilient, force-applying element urging said valve core to a liquid-tight closed position wherein said nose surfaces engage said valve seat, an operating rod carrier and an operating rod carried thereby and secured to said carrier for axial movement as a unit, said operating rod having a rear end portion and a forward end portion with sealing surfaces cooperating with radially inner, annular surfaces on said dispensing nozzle adjacent its discharge end, an operative connection between a portion of said operating rod and a trigger mounted for movement relative to said valve body, with said trigger and said rod being constructed and arranged so that trigger movement unseats said valve core and said forward end of said operating rod to permit fluent products to flow from said product inlet passage into and through said outlet passage and out of said discharge end of said dispensing nozzle.

18. In a dispensing gun for fluid products, wherein said gun includes a valve body having a formation for a liquid-tight attachment to a source of fluent products, a product inlet passage, a product outlet passage and a valve disposed between said inlet and outlet passages, said valve having a core portion axially movable between extended and retracted positions, a resilient force-applying element biasing said core towards said extended position, with said core being retractable by the application of a force acting through a trigger, the improvement comprising a stiff but resilient barrier sleeve surrounding said force applying element, having one portion affixed to a part of said valve body in liquid-tight relation, and having another portion attached to said nose, and said barrier including a sleeve body portion having a stiffness sufficient to avoid radial collapse in response to external pressure from said valve body interior toward said force applying element, the portion of said barrier sleeve adjacent said core, upon retraction of said core, folding axially inwardly upon itself so as to extend axially inwardly along at least a part of the inner surface of said annular barrier wall, said barrier sleeve, in its inwardly folded position thereby providing additional resistance to radial collapse under forces present in said valve body.

* * * * *